(12) United States Patent
Soricut et al.

(10) Patent No.: US 7,974,833 B2
(45) Date of Patent: Jul. 5, 2011

(54) WEIGHTED SYSTEM OF EXPRESSING LANGUAGE INFORMATION USING A COMPACT NOTATION

(75) Inventors: Radu Soricut, Manhattan Beach, CA (US); Daniel Marcu, Manhattan Beach, CA (US)

(73) Assignee: Language Weaver, Inc., Marina Del Rey, CA (US)

( * ) Notice: Subject to any disclaimer, the term of this patent is extended or adjusted under 35 U.S.C. 154(b) by 1684 days.

(21) Appl. No.: 11/158,897

(22) Filed: Jun. 21, 2005

(65) Prior Publication Data
US 2007/0016400 A1    Jan. 18, 2007

(51) Int. Cl.
*G10L 17/27* (2006.01)
(52) U.S. Cl. .................. 704/9; 704/7; 704/8; 704/257
(58) Field of Classification Search .................. None
See application file for complete search history.

(56) References Cited

U.S. PATENT DOCUMENTS

| | | |
|---|---|---|
| 4,502,128 A | 2/1985 | Okajima et al. |
| 4,599,691 A | 7/1986 | Sakaki et al. |
| 4,787,038 A | 11/1988 | Doi et al. |
| 4,814,987 A | 3/1989 | Miyao et al. |
| 4,942,526 A | 7/1990 | Okajima et al. |
| 5,146,405 A | 9/1992 | Church |
| 5,181,163 A | 1/1993 | Nakajima et al. |
| 5,212,730 A | 5/1993 | Wheatley et al. |
| 5,267,156 A | 11/1993 | Nomiyama |
| 5,311,429 A | 5/1994 | Tominaga |
| 5,432,948 A | 7/1995 | Davis et al. |
| 5,477,451 A | 12/1995 | Brown et al. |
| 5,510,981 A | 4/1996 | Berger et al. |
| 5,644,774 A | 7/1997 | Fukumochi et al. |
| 5,696,980 A | 12/1997 | Brew |
| 5,724,593 A | 3/1998 | Hargrave, III et al. |
| 5,761,631 A | 6/1998 | Nasukawa |
| 5,781,884 A | 7/1998 | Pereira et al. |
| 5,805,832 A | 9/1998 | Brown et al. |
| 5,848,385 A | 12/1998 | Poznanski et al. |
| 5,867,811 A | 2/1999 | O'Donoghue |
| 5,870,706 A | 2/1999 | Alshawi |
| 5,903,858 A | 5/1999 | Saraki |
| 5,987,404 A | 11/1999 | Della Pietra et al. |
| 5,991,710 A | 11/1999 | Papineni et al. |

(Continued)

FOREIGN PATENT DOCUMENTS

EP   0469884 A2   2/1992
(Continued)

OTHER PUBLICATIONS

Nederhof et al.,IDL-Expressions: A formalism for Representing and Parsing Finite Languages in Natural Languages Processing, Mar. 2004; Journal of Artificial Intelligence Research 21; pp. 287-317.*

(Continued)

*Primary Examiner* — Leonard Saint Cyr
(74) *Attorney, Agent, or Firm* — Carr & Ferrell LLP

(57) ABSTRACT

A special notation that extends the notion of IDL by weighted operators. The Weighted IDL or WIDL can be intersected with a language model, for example an n-gram language model or a syntax-based language model. The intersection is carried out by converting the IDL to a graph, and unfolding the graph in a way which maximizes its compactness.

36 Claims, 6 Drawing Sheets

U.S. PATENT DOCUMENTS

| | | | |
|---|---|---|---|
| 6,031,984 | A | 2/2000 | Walser |
| 6,032,111 | A | 2/2000 | Mohri |
| 6,092,034 | A | 7/2000 | McCarley et al. |
| 6,119,077 | A | 9/2000 | Shinozaki |
| 6,131,082 | A | 10/2000 | Hargrave, III et al. |
| 6,182,014 | B1 | 1/2001 | Kenyon et al. |
| 6,205,456 | B1 | 3/2001 | Nakao |
| 6,223,150 | B1 | 4/2001 | Duan et al. |
| 6,236,958 | B1 | 5/2001 | Lange et al. |
| 6,278,967 | B1 | 8/2001 | Akers et al. |
| 6,285,978 | B1 | 9/2001 | Bernth et al. |
| 6,289,302 | B1 | 9/2001 | Kuo |
| 6,304,841 | B1 | 10/2001 | Berger et al. |
| 6,311,152 | B1 | 10/2001 | Bai et al. |
| 6,360,196 | B1 | 3/2002 | Poznanski et al. |
| 6,389,387 | B1 | 5/2002 | Poznanski et al. |
| 6,393,388 | B1 | 5/2002 | Franz et al. |
| 6,393,389 | B1 | 5/2002 | Chanod et al. |
| 6,415,250 | B1 | 7/2002 | van den Akker |
| 6,460,015 | B1 | 10/2002 | Hetherington et al. |
| 6,502,064 | B1 | 12/2002 | Miyahira et al. |
| 6,782,356 | B1 | 8/2004 | Lopke |
| 6,810,374 | B2 | 10/2004 | Kang |
| 6,904,402 | B1 | 6/2005 | Wang et al. |
| 7,107,215 | B2 | 9/2006 | Ghali |
| 7,113,903 | B1 | 9/2006 | Riccardi et al. |
| 2002/0188438 | A1 | 12/2002 | Knight et al. |
| 2002/0198701 | A1 | 12/2002 | Moore |
| 2004/0030551 | A1 | 2/2004 | Marcu et al. |

FOREIGN PATENT DOCUMENTS

| | | |
|---|---|---|
| EP | 0715265 A2 | 6/1996 |
| EP | 0933712 A2 | 8/1999 |
| JP | 07244666 | 1/1995 |
| JP | 10011447 | 1/1998 |
| JP | 11272672 | 10/1999 |

OTHER PUBLICATIONS

Abney, Stephen, "Parsing by Chunks," 1991, Principle-Based Parsing: Computation and Psycholinguistics, vol. 44, pp. 257-279.

Al-Onaizan et al., "Statistical Machine Translation," 1999, JHU Summer Tech Workshop, Final Report, pp. 1-42.

Al-Onaizan, Y. and Knight, K., "Named Entity Translation: Extended Abstract" 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL,pp. 400-408.

Al-Onaizan et al., "Translating with Scarce Resources," 2000, 17th National Conference of the American Association for Artificial Intelligence, Austin, TX, pp. 672-678.

Alshawi et al., "Learning Dependency Translation Models as Collections of Finite-State Head Transducers," 2000, Computational Linguistics, vol. 26, pp. 45-60.

Arbabi et al., "Algorithms for Arabic name transliteration," Mar. 1994, IBM Journal of Research and Development, vol. 38, Issue 2, pp. 183-194.

Barnett et al., "Knowledge and Natural Language Processing," Aug. 1990, Communications of the ACM, vol. 33, Issue 8, pp. 50-71.

Bangalore, S. and Rambow, O., "Corpus-Based Lexical Choice in Natural Language Generation," 2000, Proc. of the 38th Annual ACL, Hong Kong, pp. 464-471.

Bangalore, S. and Rambow, O., "Exploiting a Probabilistic Hierarchical Model for Generation," 2000, Proc. of 18th conf. on Computational Linguistics, vol. 1, pp. 42-48.

Bangalore, S. And Rambow, O., "Evaluation Metrics for Generation," 2000, Proc. of the 1st International Natural Language Generation Conf., vol. 14, p. 1-8.

Bangalore, S. and Rambow, O., "Using TAGs, a Tree Model, and a Language Model for Generation," May 2000, Workshop TAG+5, Paris.

Baum, Leonard, "An Inequality and Associated Maximization Technique in Statistical Estimation for Probabilistic Functions of Markov Processes", 1972, Inequalities 3:1-8.

Bikel et al., "An Algorithm that Learns What's in a Name," 1999, Machine Learning Journal Special Issue on Natural Language Learning, vol. 34, pp. 211-232.

Brants, Thorsten, "TnT—A Statistical Part-of-Speech Tagger," 2000, Proc. of the 6th Applied Natural Language Processing Conference, Seattle.

Brill, Eric. "Transformation-Based Error-Driven Learning and Natural Language Processing: A Case Study in Part of Speech Tagging", 1995, Computational Linguistics, vol. 21, No. 4, pp. 543-565.

Brown et al., "A Statistical Approach to Machine Translation," Jun. 1990, Computational Linguistics, vol. 16, No. 2, pp. 79-85.

Brown, Ralf, "Automated Dictionary Extraction for "Knowledge-Free" Example-Based Translation," 1997, Proc. of 7th Int'l Conf. on Theoretical and Methodological Issues in MT, Santa Fe, NM, pp. 111-118.

Brown et al., "The Mathematics of Statistical Machine Translation: Parameter Estimation," 1993, Computational Linguistics, vol. 19, Issue 2, pp. 263-311.

Brown et al., "Word-Sense Disambiguation Using Statistical Methods," 1991, Proc. of 29th Annual ACL, pp. 264-270.

Carl, Michael. "A Constructivist Approach to Machine Translation," 1998, New Methods of Language Processing and Computational Natural Language Learning, pp. 247-256.

Chen, K. and Chen, H., "Machine Translation: An Integrated Approach," 1995, Proc. of 6th Int'l Conf. on Theoretical and Methodological Issue in MT, pp. 287-294.

Chinchor, Nancy, "MUC-7 Named Entity Task Definition," 1997, Version 3.5.

Clarkson, P. and Rosenfeld, R., "Statistical Language Modeling Using the CMU-Cambridge Toolkit", 1997, Proc. ESCA Eurospeech, Rhodes, Greece, pp. 2707-2710.

Corston-Oliver, Simon, "Beyond String Matching and Cue Phrases: Improving Efficiency and Coverage in Discourse Analysis",1998, The AAAI Spring Symposium on Intelligent Text Summarization, pp. 9-15.

Dagan, I. and Itai, A., "Word Sense Disambiguation Using a Second Language Monolingual Corpus", 1994, Computational Linguistics, vol. 20, No. 4, pp. 563-596.

Dempster et al., "Maximum Likelihood from Incomplete Data via the EM Algorithm", 1977, Journal of the Royal Statistical Society, vol. 39, No. 1, pp. 1-38.

Diab, M. and Finch, S., "A Statistical Word-Level Translation Model for Comparable Corpora," 2000, In Proc.of the Conference on ContentBased Multimedia Information Access (RIAO).

Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.

Elhadad, M. and Robin, J., "Controlling Content Realization with Functional Unification Grammars", 1992, Aspects of Automated Natural Language Generation, Dale et al. (eds)., Springer Verlag, pp. 89-104.

Elhadad et al., "Floating Constraints in Lexical Choice", 1996, ACL, 23(2): 195-239.

Elhadad, Michael, "FUF: the Universal Unifier User Manual Version 5.2", 1993, Department of Computer Science, Ben Gurion University, Beer Sheva, Israel.

Elhadad. M. and Robin, J., "SURGE: a Comprehensive Plug-in Syntactic Realization Component for Text Generation", 1999 (available at http://www.cs.bgu.ac.il/~elhadad/pub.html).

Elhadad, Michael, "Using Argumentation to Control Lexical Choice: A Functional Unification Implementation", 1992, Ph.D. Thesis, Graduate School of Arts and Sciences, Columbia University.

Fung, Pascale, "Compiling Bilingual Lexicon Entries From a Non-Parallel English-Chinese Corpus", 1995, Proc. of the Third Workshop on Very Large Corpora, Boston, MA, pp. 173-183.

Fung, P. and Yee, L., "An IR Approach for Translating New Words from Nonparallel, Comparable Texts", 1998, 36th Annual Meeting of the ACL, 17th International Conference on Computational Linguistics, pp. 414-420.

Gale, W. and Church, K., "A Program for Aligning Sentences in Bilingual Corpora," 1991, 29th Annual Meeting of the ACL, pp. 177-183.

Germann, Ulrich, "Building a Statistical Machine Translation System from Scratch: How Much Bang for the Buck Can We Expect?" Proc. of the Data-Driven MT Workshop of ACL-01, Toulouse, France, 2001.

Germann et al., "Fast Decoding and Optimal Decoding for Machine Translation", 2001, Proc. of the 39th Annual Meeting of the ACL, Toulouse, France, pp. 228-235.

Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.

Grefenstette, Gregory, "The World Wide Web as a Resource for Example-Based Machine Translation Tasks", 1999, Translating and the Computer 21, Proc. of the 21st International Conf. on Translating and the Computer, London, UK, 12 pp.

Hatzivassiloglou, V. et al., "Unification-Based Glossing", 1995, Proc. of the International Joint Conference on Artificial Intelligence, pp. 1382-1389.

Ide, N. and Veronis, J., "Introduction to the Special Issue on Word Sense Disambiguation: The State of the Art", Mar. 1998, Computational Linguistics, vol. 24, Issue 1, pp. 2-40.

Imamura, Kenji, "Hierarchical Phrase Alignment Harmonized with Parsing", 2001, in Proc. of NLPRS, Tokyo.

Jelinek, F., "Fast Sequential Decoding Algorithm Using a Stack", Nov. 1969, IBM J. Res. Develop., vol. 13, No. 6, pp. 675-685.

Jones, K. Sparck, "Experiments in Relevance Weighting of Search Terms", 1979, Information Processing & Management, vol. 15, Pergamon Press Ltd., UK, pp. 133-144.

Knight, K. and Yamada, K., "A Computational Approach to Deciphering Unknown Scripts," 1999, Proc. of the ACL Workshop on Unsupervised Learning in Natural Language Processing.

Knight, K. and Al-Onaizan, Y., "A Primer on Finite-State Software for Natural Language Processing", 1999 (available at http://www.isi.edu/licensed-sw/carmel).

Knight, Kevin, "A Statistical MT Tutorial Workbook," 1999, JHU Summer Workshop (available at http://www.isi.edu/natural-language/mt/wkbk.rtf).

Knight, Kevin, "Automating Knowledge Acquisition for Machine Translation," 1997, AI Magazine 18(4).

Knight, K. and Chander, I., "Automated Postediting of Documents,"1994, Proc. of the 12th Conference on Artificial Intelligence, pp. 779-784.

Knight, K. and Luk, S., "Building a Large-Scale Knowledge Base for Machine Translation," 1994, Proc. of the 12th Conference on Artificial Intelligence, pp. 773-778.

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, 25(4).

Knight et al., "Filling Knowledge Gaps in a Broad-Coverage Machine Translation System," 1995, Proc. of the14th International Joint Conference on Artificial Intelligence, Montreal, Canada, vol. 2, pp. 1390-1396.

Knight, Kevin, "Integrating Knowledge Acquisition and Language Acquisition," May 1992, Journal of Applied Intelligence, vol. 1, No. 4.

Knight et al., "Integrating Knowledge Bases and Statistics in MT," 1994, Proc. of the Conference of the Association for Machine Translation in the Americas.

Knight, Kevin, "Learning Word Meanings by Instruction,"1996, Proc. of the National Conference on Artificial Intelligence, vol. 1, pp. 447-454.

Knight, K. and Graehl, J., "Machine Transliteration", 1997, Proc. of the ACL-97, Madrid, Spain.

Knight, K. et al., "Machine Transliteration of Names in Arabic Text," 2002, Proc. of the ACL Workshop on Computational Approaches to Semitic Languages.

Knight, K. and Marcu, D., "Statistics-Based Summarization—Step One: Sentence Compression," 2000, American Association for Artificial Intelligence Conference, pp. 703-710.

Knight et al., "Translation with Finite-State Devices," 1998, Proc. of the 3rd AMTA Conference, pp. 421-437.

Knight, K. and Hatzivassiloglou, V., "Two-Level, Many-Paths Generation," 1995, Proc. of the 33rd Annual Conference of the ACL, pp. 252-260.

Knight, Kevin, "Unification: A Multidisciplinary Survey," 1989, ACM Computing Surveys, vol. 21, No. 1.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models," 2001, Conference on Empirical Methods in Natural Language Processing.

Kurohashi, S. and Nagao, M., "Automatic Detection of Discourse Structure by Checking Surface Information in Sentences," 1994, Proc. of COL-LING '94, vol. 2, pp. 1123-1127.

Langkilde-Geary, Irene, "An Empirical Verification of Coverage and Correctness for a General-Purpose Sentence Generator," 1998, Proc. 2nd Int'l Natural Language Generation Conference.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

Langkilde, Irene, "Forest-Based Statistical Sentence Generation," 2000, Proc. of the 1st Conference on North American chapter of the ACL, Seattle, WA, pp. 170-177.

Langkilde, I. and Knight, K., "The Practical Value of N-Grams in Generation," 1998, Proc. of the 9th International Natural Language Generation Workshop, p. 248-255.

Langkilde, I. and Knight, K., "Generation that Exploits Corpus-Based Statistical Knowledge," 1998, Proc. of the COLING-ACL, pp. 704-710.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [redacted].

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.

Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.

Marcu, Daniel, "Discourse trees are good indicators of importance in text," 1999, Advances in Automatic Text Summarization, The MIT Press, Cambridge, MA.

Marcu, Daniel, "Instructions for Manually Annotating the Discourse Structures of Texts," 1999, Discourse Annotation, pp. 1-49.

Marcu, Daniel, "The Rhetorical Parsing of Natural Language Texts," 1997, Proceedings of ACL/EACL '97, pp. 96-103.

Marcu, Daniel, "The Rhetorical Parsing, Summarization, and Generation of Natural Language Texts," 1997, Ph.D. Thesis, Graduate Department of Computer Science, University of Toronto.

Marcu, Daniel, "Towards a Unified Approach to Memory- and Statistical-Based Machine Translation," 2001, Proc. of the 39th Annual Meeting of the ACL, pp. 378-385.

Melamed, I. Dan, "A Word-to-Word Model of Translational Equivalence," 1997, Proc. of the 35th Annual Meeting of the ACL, Madrid, Spain, pp. 490-497.

Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.

Melamed, I. Dan, "Empirical Methods for Exploiting Parallel Texts," 2001, MIT Press, Cambridge, MA [table of contents].

Meng et al., "Generating Phonetic Cognates to Handle Named Entities in English-Chinese Cross-Language Spoken Document Retrieval," 2001, IEEE Workshop on Automatic Speech Recognition and Understanding, pp. 311-314.

Miike et al., "A full-text retrieval system with a dynamic abstract generation function," 1994, Proceedings of SI-GIR '94, pp. 152-161.

Mikheev et al., "Named Entity Recognition without Gazeteers," 1999, Proc. of European Chapter of the ACL, Bergen, Norway, pp. 1-8.

Monasson et al., "Determining computational complexity from characteristic 'phase transitions'," Jul. 1999, Nature Magazine, vol. 400, pp. 133-137.

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.

Niessen, S. and Ney, H, "Toward hierarchical models for statistical machine translation of inflected languages," 2001, Data-Driven Machine Translation Workshop, Toulouse, France, pp. 47-54.

Och, F. and Ney, H, "Improved Statistical Alignment Models," 2000, 38th Annual Meeting of the ACL, Hong Kong, pp. 440-447.

Och et al., "Improved Alignment Models for Statistical Machine Translation," 1999, Proc. of the Joint Conf. of Empirical Methods in Natural Language Processing and Very Large Corpora, pp. 20-28.

Papineni et al., "Bleu: a Method for Automatic Evaluation of Machine Translation," 2001, IBM Research Report, RC22176(WO102-022).

Pla et al., "Tagging and Chunking with Bigrams," 2000, Proc. of the 18th Conference on Computational Linguistics, vol. 2, pp. 614-620.

Rapp, Reinhard, Automatic Identification of Word Translations from Unrelated English and German Corpora, 1999, 37th Annual Meeting of the ACL, pp. 519-526.

Rapp, Reinhard, "Identifying Word Translations in Non-Parallel Texts," 1995, 33rd Annual Meeting of the ACL, pp. 320-322.

Resnik, P. and Yarowsky, D., "A Perspective on Word Sense Disambiguation Methods and Their Evaluation," 1997, Proceedings of SIGLEX '97, Washington, DC, pp. 79-86.

Resnik, Philip, "Mining the Web for Bilingual Text," 1999, 37th Annual Meeting of the ACL, College Park, MD, pp. 527-534.

Rich, E. and Knight, K., "Artificial Intelligence, Second Edition," 1991, McGraw-Hill Book Company [redacted].

Richard et al., "Visiting the Traveling Salesman Problem with Petri nets and application in the glass industry," Feb. 1996, IEEE Emerging Technologies and Factory Automation, pp. 238-242.

Robin, Jacques, "Revision-Based Generation of Natural Language Summaries Providing Historical Background: Corpus-Based Analysis, Design Implementation and Evaluation," 1994, Ph.D. Thesis, Columbia University, New York.

Sang, E. and Buchholz, S., "Introduction to the CoNLL-2000 Shared Task: Chunking," 20002, Proc. of CoNLL-2000 and LLL-2000, Lisbon, Portugal, pp. 127-132.

Schmid, H., and Walde, S., "Robust German Noun Chunking With a Probabilistic Context-Free Grammar," 2000, Proc. of the 18th Conference on Computational Linguistics, vol. 2, pp. 726-732.

Selman et al., "A New Method for Solving Hard Satisfiability Problems," 1992, Proc. of the 10th National Conference on Artificial Intelligence, San Jose, CA, pp. 440-446.

Schutze, Hinrich, "Automatic Word Sense Discrimination," 1998, Computational Linguistics, Special Issue on Word Sense Disambiguation, vol. 24, Issue 1, pp. 97-123.

Sobashima et al., "A Bidirectional Transfer-Driven Machine Translation System for Spoken Dialogues," 1994, Proc. of 15th Conference on Computational Linguistics, vol. 1, pp. 64-68.

Shapiro, Stuart (ed.), "Encyclopedia of Artificial Intelligence, 2nd edition", vol. 2, 1992, John Wiley & Sons Inc; "Unification" article, K. Knight, pp. 1630-1637.

Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164.

Stalls, B. and Knight, K., "Translating Names and Technical Terms in Arabic Text," 1998, Proc. of the COLING/ACL Workkshop on Computational Approaches to Semitic Language.

Sun et al., "Chinese Named Entity Identification Using Class-based Language Model," 2002, Proc. of 19th International Conference on Computational Linguistics, Taipei, Taiwan, vol. 1, pp. 1-7.

Sumita et al., "A Discourse Structure Analyzer for Japanese Text," 1992, Proc. of the International Conference on FIfth Generation Computer Systems, vol. 2, pp. 1133-1140.

Taylor et al., "The Penn Treebank: An Overview," in A. Abeill (ed.), Treebanks: Building and Using Parsed Corpora, 2003, pp. 5-22.

Tiedemann, Jorg, "Automatic Construction of Weighted String Similarity Measures," 1999, In Proceedings of the Joint SIGDAT Conference on Emperical Methods in Natural Language Processing and Very Large Corpora.

Tillmann et al., "A DP based Search Using Monotone Alignments in Statistical Translation," 1997, Proc. of the Annual Meeting of the ACL, pp. 366-372.

Tillman, C. and Xia, F., "A Phrase-Based Unigram Model for Statistical Machine Translation," 2003, Proc. of the North American Chapter of the ACL on Human Language Technology, vol. 2, pp. 106-108.

Veale, T. and Way, A., "Gaijin: A Bootstrapping, Template-Driven Approach to Example-Based MT," 1997, Proc. of New Methods in Natural Language Processing (NEMPLP97), Sofia, Bulgaria.

Vogel, S. and Ney, H., "Construction of a Hierarchical Translation Memory," 2000, Proc. of Cooling 2000, Saarbrucken, Germany, pp. 1131-1135.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Wang, Ye-Yi, "Grammar Interference and Statistical Machine Translation," 1998, Ph.D Thesis, Carnegie Mellon University, Pittsburgh, PA.

Watanbe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.

Wang, Y. and Waibel, A., "Decoding Algorithm in Statistical Machine Translation," 1996, Proc. of the 35th Annual Meeting of the ACL, pp. 366-372.

Wu, Dekai, "Stochastic Inversion Transduction Grammars and Bilingual Parsing of Parallel Corpora," 1997, Computational Linguistics, vol. 23, Issue 3, pp. 377-403.

Wu, Dekai, "A Polynomial-Time Algorithm for Statistical Machine Translation," 1996, Proc. of 34th Annual Meeting of the ACL, pp. 152-158.

Yamada, K. and Knight, K., "A Decoder for Syntax-based Statistical MT," 2001, Proceedings of the 40th Annual Meeting of the ACL, pp. 303-310.

Yamada, K. and Knight, K. "A Syntax-based Statistical Translation Model," 2001, Proc. of the 39th Annual Meeting of the ACL, pp. 523-530.

Yamamoto et al., "A Comparative Study on Translation Units for Bilingual Lexicon Extraction," 2001, Japan Academic Association for Copyright Clearance, Tokyo, Japan.

Yarowsky, David, "Unsupervised Word Sense Disambiguation Rivaling Supervised Methods," 1995, 33rd Annual Meeting of the ACL, pp. 189-196.

Callan et al., "TREC and TIPSTER Experiments with Inquery," 1994, Information Processing and Management, vol. 31, Issue 3, pp. 327-343.

Cohen, Yossi, "Interpreter for FUF," (available at ftp://ftp.cs.bgu.ac.il/pub/people/elhadad/fuf-life.lf).

Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

Nederhof, M. and Satta, G., "IDL-Expressions: A Formalism for Representing and Parsing Finite Languages in Natural Language Processing," 2004, Journal of Artificial Intelligence Research, vol. 21, pp. 281-287.

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Resnik, P. and Smith, A., "The Web as a Parallel Corpus," Sep. 2003, Computational Linguistics, Special Issue on Web as Corpus, vol. 29, Issue 3, pp. 349-380.

Russell, S. and Norvig, P., "Artificial Intelligence: A Modern Approach," 1995, Prentice-Hall, Inc., New Jersey [redacted—table of contents].

Ueffing et al., "Generation of Word Graphs in Statistical Machine Translation," 2002, Proc. of Empirical Methods in Natural Language Processing (EMNLP), pp. 156-163.

Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4, pp. 720-727.

* cited by examiner $700 \longrightarrow$ $||_{\delta 1}(FINALLY, V_{\delta 2}(THE \cdot PRISONERS. THE \cdot CAPTIVES),$
$WERE, RELEASED)$ $\delta 1 = \{ 1\ 2\ 3\ 4 : 0.25\ ;\ 2\ 3\ 1\ 4 : 0.53\ ;\ ALL\ OTHER : 0.1 \}$ $\delta 2 = \{ 1 : 0.7\ ;\ 2 : 0.3 \}$

WEIGHTED SYSTEM OF EXPRESSING LANGUAGE INFORMATION USING A COMPACT NOTATION

BACKGROUND

Text to text applications include machine translation, automated summarization, question answering, and other similar applications where a machine carries out the function of understanding some kind of input information and generating text. The input information is often "text", but can be any kind of information that is received and understandable by the machine.

Conventional text to text applications use heterogeneous methods for implementing the generation phase. Machine translation often produces sentences using application-specific decoders that are based on work that was conducted on speech recognition. Automated summarization produces abstracts using task specific strategies.

Text to text applications have struggled with use of generic natural language generation (NLG) systems, because they typically do not have access to the kind of information required by the formalisms of natural language generation systems. For example, natural language generation may require formalisms such as semantic representations, syntactic relations, and lexical dependencies. The formalisms also require information that is obtained from deep semantic relations, as well as shallow semantic relations and lexical dependency relation. Machine systems typically do not have access to deep subject verb or verb object relations.

A number of natural language generation systems are known, including FUF, Nitrogen, HALogen, and Fergus.

The formal language of IDL (Interleave; Disjunction; Lock) was proposed by Mark-Jan Nederhof and Giorgio Satta in their 2004 paper: IDLexpressions: a formalism for representing and parsing finite languages in natural language processing. Journal of Artificial Intelligence Research, 21: 287-317. Using IDL expressions, one can compactly represent word- and phrase-based encoded meanings. Nederhof and Satta also present algorithms for intersecting IDL expressions with non-probabilistic context free grammars.

SUMMARY

A new language for compactly representing large sets of weighted strings is described. The original IDL language of Nederhof and Satta is extended to a weighted form that can be given a probabilistic interpretation. This language is called Weighted IDL (WIDL).

An aspect provides efficient algorithms for intersecting WIDL expressions with ngram and syntax-based language models. It thus enables one to create from the set of strings that are compactly represented by a WIDL expression those that are grammatical according to some external knowledge resources using those ngram- and syntax-based language models.

An aspect describes how WIDL expressions and the above mentioned intersection algorithms can be used in text-to-text natural language applications, such as machine translation and summarization.

According to one aspect of the present system, probability distributions are associated with weighted IDL ("WIDL) operators, to allow weighted IDL expressions to probabilistically represent biases over the entire set of strings that are subsumed by the weighted IDL expression.

The WIDL expressions may be intersected with various language model combinations, while preserving the compactness property of WIDL expressions. The output is a string that is encoded by the input WIDL expression that receives the highest score based on the combination of WIDL and language model scores.

BRIEF DESCRIPTION OF THE DRAWINGS

These and other aspects will now be described in detail with reference to the accompanying drawings, in which.

DETAILED DESCRIPTION

Figure 1:
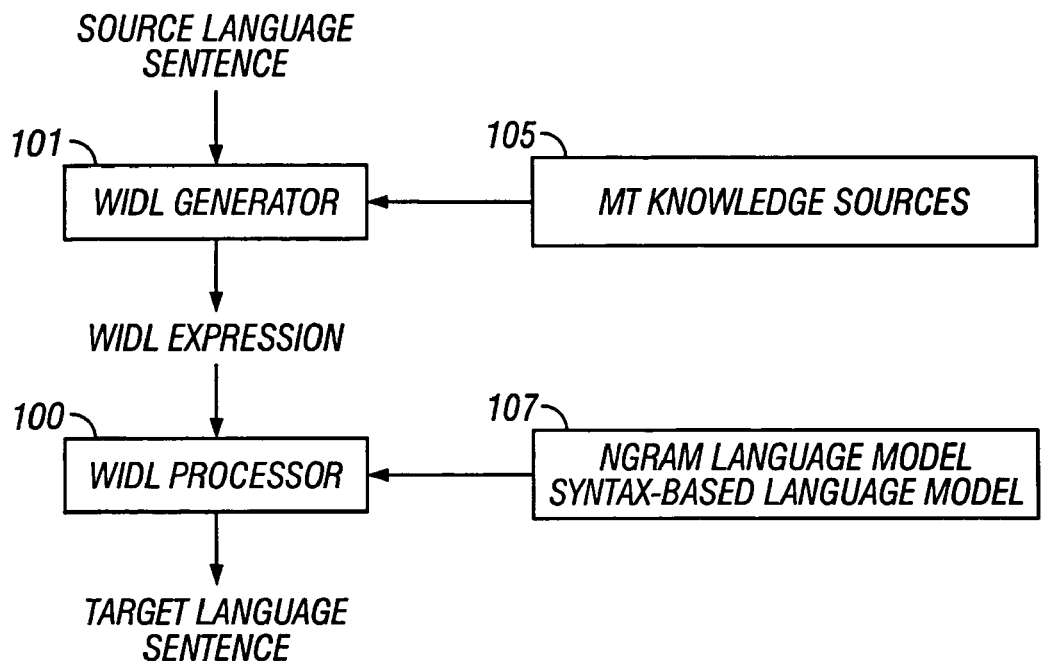
FIG. 1 shows a block diagram of an application of this system to a machine translation device.

FIG. 1 illustrates an exemplary hardware device and its flow, which may execute the operations that are described with reference to the flowcharts. For the application of machine translation (MT), a WIDL expression generation module 101 is assumed to have access to various MT sources 105. The sources may be parallel corpora of multiple language information. Specifically, the sources may include translation memories, probabilistic and non-probabilistic word- and phrase-based dictionaries, glossaries, Internet information, parallel corpora in multiple languages, non-parallel corpora in multiple languages having similar subject matter, and human-created translations. The generation module 101 takes as input a string in a source language L1 and uses the information in 105 to create a WIDL expression in the target language that compactly encodes all possible renderings of the input string in the target language. The WIDL expression is then processed by the WIDL processor 100, i.e., it is intersected with ngram and syntax-based language models in the target language in order to produce the string of highest probability under all models (the WIDL probability; the language model probabilities).

Figure 2:
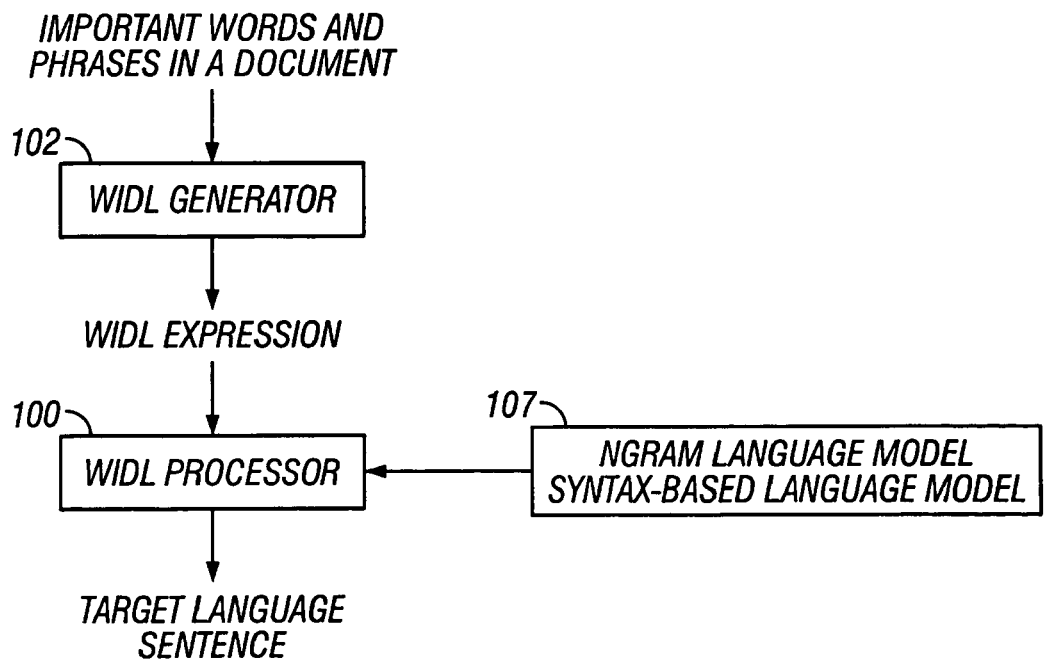
FIG. 2 shows a block diagram of an application of this system to a machine summarization application.

Alternatively, the component that generates a WIDL expression can be used in conjunction with other text-to-text applications. For example, in summarization as shown in FIG. 2, the words and phrases that are part of the WIDL expression may be chosen by another process as the most important words/phrases in the text. A summarization specific module (102) may generate a WIDL expression.

By intersecting this WIDL expression with ngram and syntax-based language models via the same processor 100, one can generate in this instance sentences that are grammatical and likely to contain important information in a document. The same process can be used similarly in any other applications, such as speech recognition, paraphrasing, natural language generation, question answering, or the like—in any application in which one wishes to generate text.

The WIDL processor 100 may be any general purpose computer, and can be effected by a microprocessor, a digital signal processor, or any other processing device that is capable of executing the operations described herein.

The flowcharts described herein can be instructions which are embodied on a machine-readable medium such as a magnetic disc, optical disk, or any other medium that can be read by a computer. Alternatively, the flowchart can be executed by dedicated hardware, or by any known or later discovered processing device.

The present application describes use of weighted IDL operators. These operators use information that is available in many text to text applications to generate available information relevant to those text to text applications. This may include bias for word choice, word order, phrasal combination and the like.

Weighted IDL, as described herein, encodes meaning via words and phrases that are combined using a set of operator types. The operator types may include:

A V type operator which handles word choice

A (•) dot type operator which handles precedence for phrasal combination a lock (X) operator, The language models 107 can be n-gram and syntax based language models, as shown. In one implementation of an ngram language model, the probability of a string is computed by multiplying the probabilities of each word in the string given n words before it. In one implementation of a syntax-based language model, one computes the probability of a hierarchical structure associated with a string (a syntactic tree) by multiplying the probabilities of creating each of the nodes in the hierarchical structure.

WIDL allows the "language", which here refers only to the large set of strings being described by the WIDL, to be described using a very compact representation. Input to the model is produced, and the output of the generation process is the string that is encoded by the input expression that has received the highest score based on the combination of WIDL and language model scores.

IDL was described by Nederhoff and Sata, in their 2004 paper entitled "IDL-expressions: a formalism for representing and parsing finite languages in natural langauge processing" Journal of artificial intelligence research, 21:287-317. IDL expressions may be used as an application independent, information-slim representation language for natural language creation. IDL operators handle natural constraints such as word choice and precedents, constructions such as phrasal combination and under-specifications such as word order.

A brief description of IDL as it applies to this embodiment is provided. The concatenation (•)operator uses strings encoded by its argument expressions to obtain concatenated strings that respect the order of the arguments. For example, the concatenation a•b encodes the singleton set {ab}.

The interleave ||operator interleaves strings encoded by its argument expression. For example, ||(a.b,c) encodes the sets {cab, acb, abc}

The disjunction operator V allows a choice among the strings that are encoded by its argument expressions. For example, V(a,b) encodes the set {a,b}

The lock operator X takes only one argument, and locks in the strings encoded by its argument expression such that no additional material can be interleaved. For example, ||(x (a•b), c) encodes the set {cab,abc}.

Consider the following IDL expression:

||(finally, V(x(the•prisoners), x(the•captives))• were•released) (1)

The operators define the way the natural language generation works. The concatenation operator captures precedence constraints. For example, in expression 1, the determiner "the" appears before the noun it determines, here "prisoners and captives". The lock operator X enforces the phrase encoding constraints. Here, the lock operator maintains the phrase "the captives" as a phrase which needs to be used as a whole, as well as maintaining the phrase "the captives".

The disjunction operator V allows for multiple word phrase choices. That is, the disjunction between "the prisoners" and "the captives" allows either one to be used. The ||operator allows for word order freedom. That is, word orders can be underspecified at meanings at the representation level. IDL allows many different strings to be encoded in this way, using a very compact representation. For example, expression 1 can encode the strings:

Finally the prisoners were released

The captives finally were released

The prisoners were finally released

However, the following strings are not part of the language defined by expression 1:

the finally captives were released (this string is disallowed because the lock operator locks the phrase "the captives")

the prisoners were released (this string is disallowed because the Interleave operator requires all of its arguments to be represented, and this phrase ignores the "finally")

finally the captives released were (this string violates the order that is imposed by the precedence operator (were • released).

Figure 4:
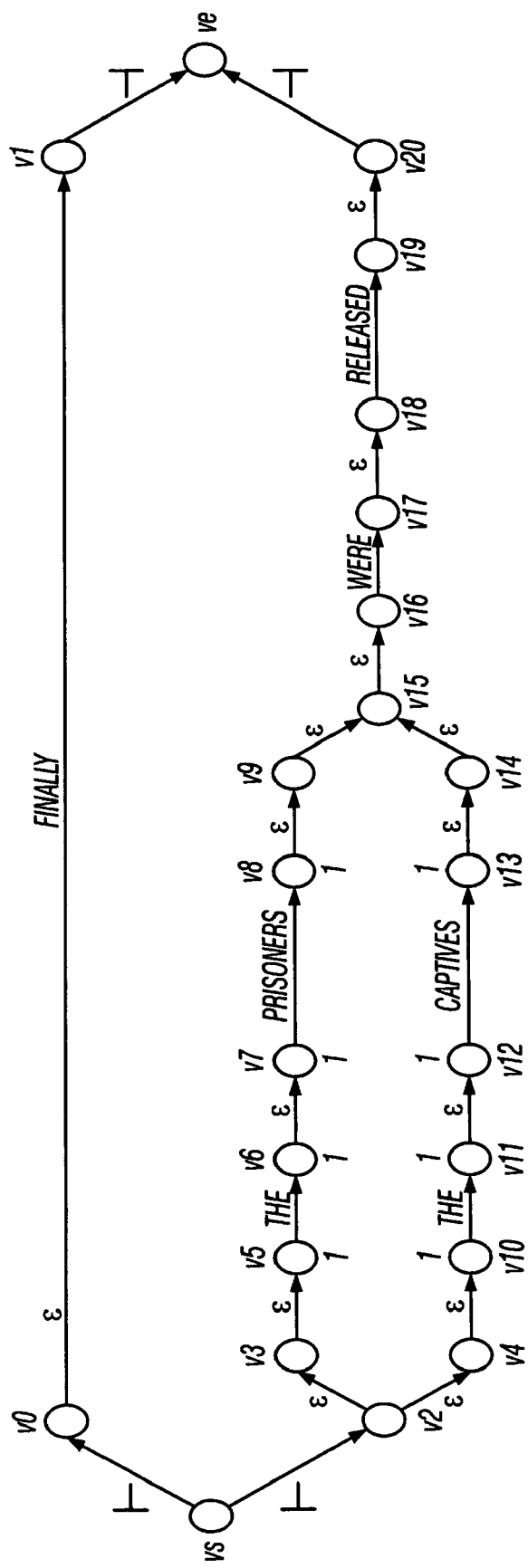
FIG. 4 illustrates a IDL graph and FIG. 5 *a*-5*e* show cuts of the IDL graph, with FIG. 6 showing the finite state acceptor corresponding to that graph.

While the above has described IDL expressions in a text form, IDL graphs may be used as an equivalent method of representing the IDL expressions. FIG. 4 shows an IDL graph corresponding to the IDL expression 1 above. The vertex vs is the start vertex, and the vertex ve is the end vertex. Different for Texas bar resulting from different operator expansions. Different vertices are obtained from different operators. The vertices are also ranked, to enforce a higher priority on the processing of the higher ranked vertices. In FIG. 4, the vertices are ranked as either being 1 or 0 (with 0 rankings not shown in FIG. 4).

The graph G(Π) defines a finite language as the set of strings that can be generated from an IDL specific traversal of G(Π) resulting in this traversing the start to the end.

The IDL graphs can also be intersected with finite state acceptors. An advantage of the IDL representation is its compactness; the IDL need not enumerate all possible interleavings, the notation inherently represents these interleavings without stating them all expressly.

WIDL expressions are created from strings using the word choice/disjunction operator V, the concatenation or precedence operator (•), and the locked interleaved operator ||. The WIDL expressions described herein have probability distributions associated with each V and || operator. These probability distributions are used to induce a probability value to each of the strings encoded under the operators.

A formal definition of the alphabet of WIDL expressions follows

---

Definition 1 Let $\Sigma$ be some finite alphabet (called input alphabet), let $\Delta$ be another, disjoint, finite alphabet (called distribution alphabet), and let $\epsilon$ be a symbol not in $\Sigma$. A WIDL-expression over $\Sigma$ is a string $\pi$ satisfying one of the following conditions:

1. $\pi = a$, with $a \in \Sigma \cup \{\epsilon\}$;
2. $\pi = V_\delta(\pi_1, \pi_2, \ldots, \pi_n)$, with $\delta \in \Delta$, $n \geq 2$, and $\pi_i$ a WIDL-expression, $1 \leq i \leq n$;
3. $\pi = ||_\delta(\pi_1, \pi_2, \ldots, \pi_n)$, with $\delta \in \Delta$, $n \geq 2$, and $\pi_i$ a WIDL-expression, $1 \leq i \leq n$;
4. $\pi = \pi_1 \cdot \pi_2$, with $\pi_1$ and $\pi_2$ WIDL-expressions The WIDL operators operate as follows: the concatenation operator (•) uses the strings encoded by its arguments to obtain concatenated strings in the order stated.

The $V_{\delta_0}$ operator defines disjunction with associated probability distribution $\delta_0$, and allows for a choice among the strings encoded by its argument expressions. The associated probability distribution δ0 is used to induce a probability distribution δ over all the strings. For example, $V_{\delta_0}$ (a,b), δ0={1:0.8,2:0.2}, encodes the set {a,b}, over which the probability distribution δ is δ(a)=δ0(1)=0.8; δ(b)=δ0(2)=0.2.

The $\|_{\delta_0}$ operator represents lock interleaved with associated probability distribution δ0. This interleaves the strings encoded by its argument expressions. This treats the strings of each argument expression as locked expressions, for example atomic expressions. For example, ‖δ0(a b,c), δ0={1 2:0.95, 2 1 "0.05} encodes the set {abc,cab}, over which δ assigns the probabilitys δ(abc)=δ0(1 2)–0.95, δ(cab)–δ0 (2 1)=0.05.

Each WIDL expression over Σ and Δ and Y has a formal interpretation as a set of strings from Σ and a probability distribution over that set of strings. The definition of Σ can be given as follows:

---

Definition 2 Let Σ be some finite alphabet (called input alphabet), let Δ be another, disjoint, finite alphabet (called distribution alphabet), and let σ be a function mapping an WIDL-expression over Σ and Δ into a set of strings in $\Sigma^+$ characterized by a probability distribution δ ∈ Δ, defined as follows:

1. σ(a) = {a},δ(a) = 1,for a ∈ Σ;
2. σ(ξ) = {∈},δ(∈) = 1;
3. σ($\pi_1 \cdot \pi_2$) = {$e_1e_2|e_1 \in \sigma(\pi_1), e_2 \in \sigma(\pi_2)$},δ($e_1e_2$) = $\delta_1(e_1) \cdot \delta_2(e_2)$, where $\delta_1$ and $\delta_2$ are the probability distributions associated with σ($\pi_1$) and σ($\pi_2$), respectively;
4. σ($V_{\delta_0}(\pi_1, \ldots, \pi_n)$) = $\cup_{i=1}^n \{e_i|e_i \in \sigma(\pi_1)\}$,δ($e_i$) = $p_i \cdot \delta_i(e_i)$, where $\delta_0$ is specified over {1,...,n} as $\delta_0(i) = p_i, \Sigma_{i=1}^n p_i = 1$, and $\delta_i$s are the probability distributions associated with each σ($\pi_i$), 1 ≤ i ≤ n;
5. σ($\|_{\delta_0}(\pi_1, \ldots, \pi_n)$) = $\cup_{\{i_1\ldots i_n\} \in Perm(n)} \{e_{i_1} \ldots e_{i_n}|e_{i_k} \in \sigma(\pi_{i_k})\}$; δ($e_{i_1} \ldots e_{i_n}$) = $p_k \cdot \delta_{i_1}(e_{i_1}) \ldots \delta_{i_n}(e_{i_n})$, where $i_1\ldots i_n \in$ Perm(n) is the k-th permutation of n elements[1], and $\delta_0$ is specified over Perm(n) as $\delta_0(i_1 \ldots i_n) = p_k, \Sigma_{k=1}^{n!} p_k = 1$, and $\delta_{ik}$s are the probability distributions associated with each σ($\pi_{i_k}$), 1 ≤ $i_k$ ≤ n.

---

The ‖δ0 in WIDL is a weaker version of IDL's parallel operator, since the lock is probabilistic, rather than absolute.

Consider the following WIDL expression (2) corresponding to the above IDL expression (1)

$\|_{\delta_1}$(finally, $V_{\delta_2}$(the • prisoners, the • captives), were, released)

$\delta_1$={1 2 3 4:0.25, 2 3 1 4:0.53, all other: 0.10}

$\delta_2$={1:0.7,2:0.3}  (2)

The language defined by the WIDL expression is weighted in the sense that it has a probability distribution associated with it. Each string in this language has an associated nonnegative real number less than or equal to one. The sum of the probabilities over the entire "language" adds up to one. The following strings, and their associated probabilities, are among those that are encoded by WIDL expression (2):

Finally the prisoners were released probability 0.25 times 0.7 equal 0.175

This string encodes the sequence 1234 (probability 0.25) for the probability of ‖δ1. It also encodes choice 1 for the argument of Vδ2 (probability 0.7) Therefore, it receives a probability of 0.25 times 0.7 equals 0.175.

The captives finally were released; probability 0.1 times 0.3 equals 0.03

This string encodes the sequence 2134 for the arguments of ‖δ0, (probability of 0.1) and choice two for the arguments of Vδ2. (Probability of 0.3.)

The prisoners were finally released; probability 0.53 times 0.7 equals 0.371.

This encodes the sequence 2314 for the arguments of ‖, and choice one for the arguments of Vδ2, probability is 0.53 times 0.7 equals 0.371.

WIDL expressions can be expressed in terms of an equivalent WIDL graph. A WIDL graph is denoted by the parameter set or "tuple" (V, E vs, ve, λ, r), where V and E are finite sets of vertices and edges respectively,
vs and ve are special vertices in V called start vertices and end vertices respectively.

λ is the edge labeling function that maps the edge set E. into the alphabet ΣU {ϵ, <δ,> δ, (δ,) δ} r is the vertex ranking function, mapping V to the set of non-negative integer numbers.

The label ϵ indicates that an edge does not consume an input signal. The labels <δ,> δ, and (δ,)δindicate the same as ϵ, but also indicate that it is the start or end of something that corresponds to a ‖δ or a Vδoperator respectively. This information may be used to handle locked strings with the intended interpretation of the locked interleaved type of operator.

The following is a formalized definition of how a WIDL expression is mapped into its WIDL graph.

Definition 3 Let Σ be a finite alphabet (called input alphabet), let Δ be another, disjoint, finite alphabet (called distribution alphabet), and let j be a non-negative integer number. Each WIDL-expression π over Σ and Δ is associated with a graph $\gamma_j(\pi)$=(V, E; $\upsilon_s, \upsilon_e, \lambda, r$), specified as follows:

1. if π=a, a∈Σ∪{ϵ}, let $\upsilon_s, \upsilon_e$ be new nodes; I define
   (a) V={$\upsilon_s, \upsilon_e$},
   (b) E={($\upsilon_s, \upsilon_e$)},
   (c) λ(($\upsilon_s, \upsilon_e$))=a for a∈Σ and λ(($\upsilon_s, \upsilon_e$))=ϵ for a=ϵ,
   (d) r($\upsilon_s$)=r($\upsilon_e$)=j;
2. if π=$V_\delta(\pi_1, \pi_2, \ldots, \pi_n)$ with $\gamma_j(\pi_i)$=($V_i, E_i, \upsilon_{i_1s}, \upsilon_{i_1e}, \lambda_i, r_i$), 1≤i≤n, let $\upsilon_s, \upsilon_e$ be new nodes; we define
   (a) V=$\cup_{i=1}^n V_i \cup \{\upsilon_s, \upsilon_e\}$,
   (b) E=$\cup_{i=1}^n E_i \cup \{(\upsilon_s, \upsilon_{i,\delta})|1\leq i\leq n\} \cup \{(\upsilon_{i,e}, \upsilon_e)|1\leq i\leq n\}$,
   (c) λ(e)=$\lambda_i$(e) for e∈$E_i$, λ(($\upsilon_s, \upsilon_{i,\delta}$))=(δ, λ(($\upsilon_{i_1e}, \upsilon_e$))= δ, 1≤i≤n,
   (d) r(υ)=$r_i$(υ) for υ∈$V_i$, r($\upsilon_s$)=r($\upsilon_e$)=j, 1≤i≤n;
3. if π=$\|_\delta(\pi_1, \pi_2, \ldots, \pi_n)$ with $\gamma_{j+1}(\pi_i)$=($V_i, E_i, \upsilon_{i_1s}, \upsilon_{i,e}, \lambda_i, r_i$), 1≤i≤n, let $\upsilon_s, \upsilon_{s_1}, \ldots, \upsilon_{s_n}, \upsilon_e, \upsilon_{e_1}, \ldots, \upsilon_{e_n}$ be new nodes; we define
   (a) V=$\cup_{i=1}^n V_i \cup \{\upsilon_s,\upsilon_{s_1}, \ldots, \upsilon_{s_n},\upsilon_e, \upsilon_{e_1}, \ldots, \upsilon_{e_n}\}$,
   (b) E=$\cup_{i=1}^n E_i \cup \{(\upsilon_s, \upsilon_{s_1}), (\upsilon_{s_1}; \upsilon_{i,s}), |1\leq i\leq n\} \cup \{(\upsilon_{i,e}, \upsilon_{e_i}), (\upsilon_{e_i},\upsilon_e), 1\leq i\leq n\}$,
   (c) λ(e)=$\lambda_i$(e) for e∈$E_i$, λ(($\upsilon_s, \upsilon_{s_i}$))=⟨δ, λ(($\upsilon_{s_i}, \upsilon_{i,s}$)=ϵ, λ(($\upsilon_{i,s}, \upsilon_{e_i}$)=ϵ, λ(($\upsilon_{e_i}, \upsilon_s$))=⟩δ, 1≤i≤n,
   (d) r(υ)=$r_i$(υ) for υ∈$V_i$, r($\upsilon_{s_i}$)=r($\upsilon_{e_i}$)=j+1, r($\upsilon_s$)=r($\upsilon_e$)= j, 1≤i≤n;
4. if π=$\pi_1 \cdot \pi_2$ with $\gamma_j(\pi_i)$=($V_i, E_i, \upsilon_{i_1s}, \upsilon_{i,e}, \lambda_i, r_i$), 1i∈{1, 2}, let $\upsilon_s, \upsilon_e$ be new nodes; we define
   (a) V=$V_1 \cup V_2$,
   (b) E=$E_1 \cup E_2 \cup \{(\upsilon_{1,e}, \upsilon_{2,s})\}$,
   (c) λ(e)=$\lambda_i$(e) for e∈$E_1 \cup E_2$, λ(($\upsilon_{1,e}, \upsilon_{2,s}$))=ϵ,
   (d) r(υ)=$r_i$(υ) for υ∈$V_1 \cup V_2$;

We define γ(π)=$\gamma_0(\pi)$. A WIDL-graph is a graph that has the form γ(π) for some WIDL-expression πover Σ and Δ.

Figure 3:
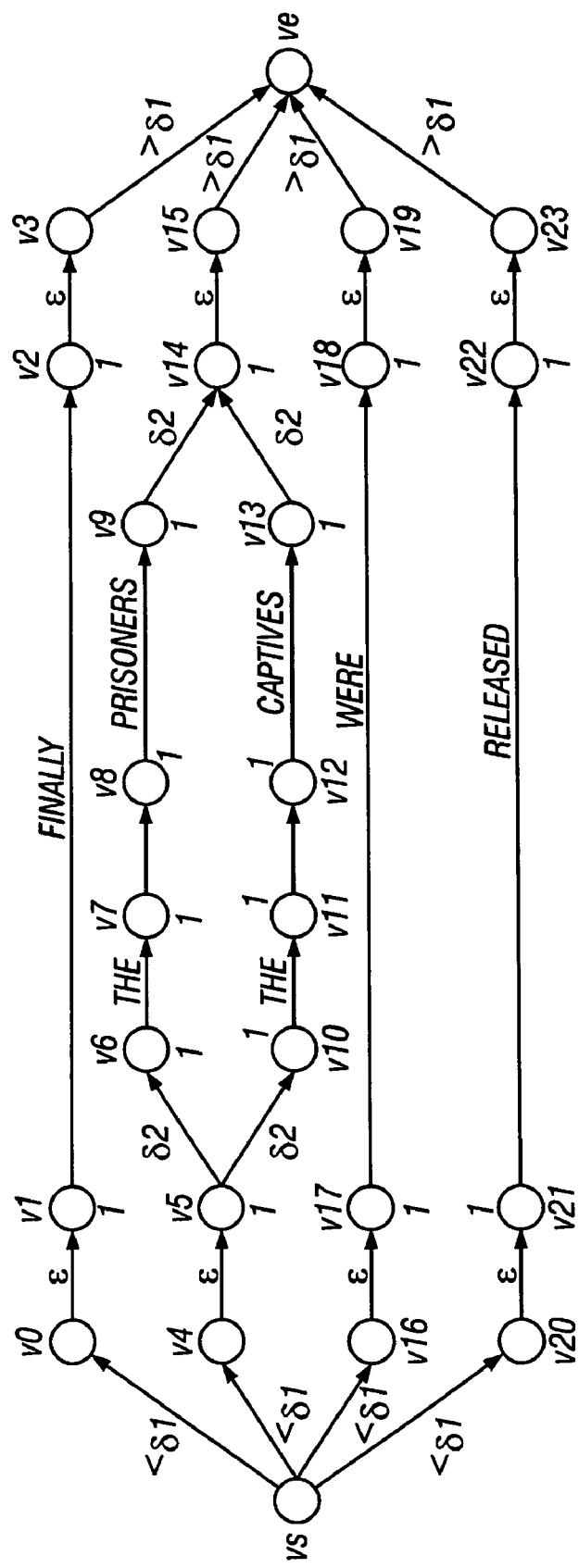
FIG. 3 shows a WIDL graph.

FIG. 3 shows the WIDL graph corresponding to expression 2 above. The vertices vs and ve respectively correspond to the start and end vertices. The other numbered vertices are between them. Vertices 0, 1, 4, 5, 16, 17, 20, 21; and 2, 3, 14, 15, 18, 19, 22 and 23 result from the expansion of the ||δ1 operator. The vertices 6, 10; and 9, 13 result from the expansion of the Vδ2 operator. FIG. 4 shows how the arguments of the parallel subscript δ1 operator all have rank one. The ranks help ensure that the desired semantics for the parallel operators is preserved.

Each weighted IDL graph has an associate finite weighted language formed of a finite set of strings with associated probability distribution, as its set of strings. An associated probability that can be obtained from a weighted IDL specific traversal of the graph starts from the start vertex and ends at the end vertex. Therefore, a WIDL expression Π and its corresponding WIDL graphs Y(Π) are said to be equivalent, since they generate the same finite weighted language, denoted as Lδ(Π).

The following text describes how to combine/intersect WIDL graphs with ngram and syntax-based language models by
- explaining first how to efficiently intersect IDL expressions with ngram language models
- explaining afterwards the changes we need to make to the proposed algorithms in order to handle WIDL graphs and syntax-based language models.

An embodiment describes how to combine the IDL-graphs and Finite-State Acceptors. The IDL formalism is linked with the more classical formalism of finite-state acceptors (FSA) (Hopcroft and Ullman, 1979). The FSA representation can naturally encode precedence multiple choice, but it lacks primitives corresponding to the interleave (Π) and lock (x) operators. As such, an FSA representation must explicitly enumerate all possible interleavings, which are inherently captured in an IDL representation. This correspondence between implicit and explicit interleavings is handled by the notion of a cut of an IDL-graph G (Π).

The IDL graph shown in FIG. 3 corresponding to the expression 1 above. FIGS. 5a-5e show cuts of the IDL graph.

Intuitively, a cut through G(Π) is a set of vertices that can be reached simultaneously when traversing G from the initial node to the final node, following the branches as prescribed by the encoded I, D, and L operators, in an attempt to produce a string in L(Π). More precisely, the initial vertex v8 is considered a cut (FIG. 5(a)). For each vertex in a given cut, a new cut is created by replacing the start vertex of some edge with the end vertex of that edge, observing the following rules:

1) the vertex that is the start of several edges is labeled using the special symbol ⊢. This is replaced by a sequence of all the end vertices of these edges (for example, v0v2 is a cut derived from v8, (FIG. 6b).

A mirror rule handles the special symbol which is actually the end of several edges ⊣.

Figure 5A:
Figure 5B:
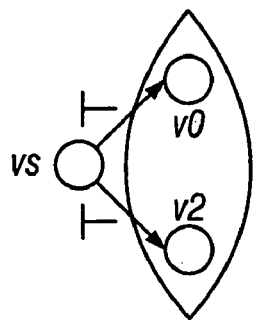
Figure 5C:
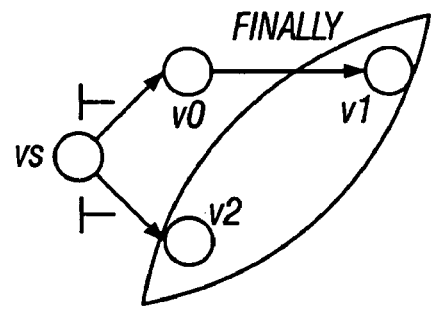
Figure 5D:
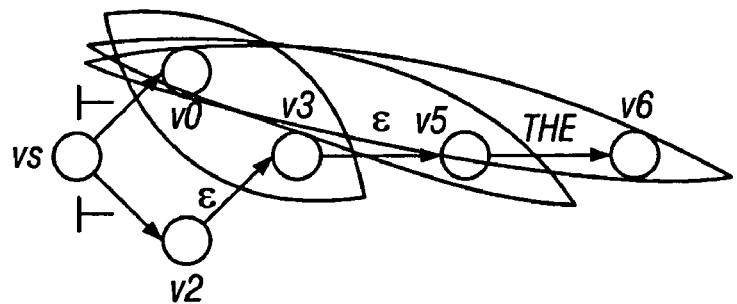
Figure 5E:
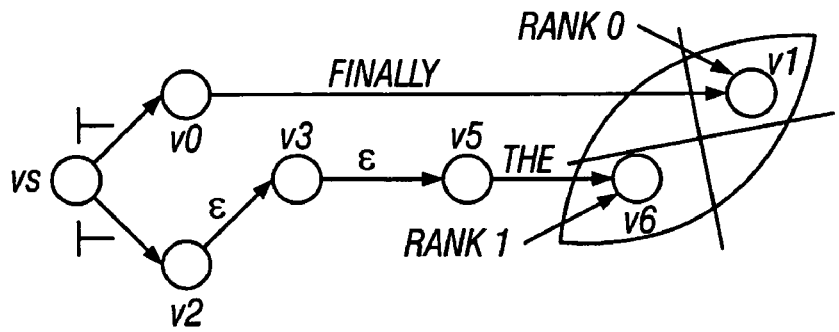

2) The vertex that is the start of an edge labeled using vocabulary items or ε is replaced by the end vertex of that edge (for example, v1v2, v0v3, v0v5, v0v6 are cuts derived from v0v2, v0v2, v0v3 and v0v5, respectively as shown in FIGS. 5c-5d, but only if the end vertex is not lower ranked any of the vertices already present in the (for example, v1v6 is not a cut that can be derived from v0v6, see FIG. 5(e).

Note that the last part of the second rule restricts set of cuts by using the ranking mechanism. If v1v6 could be a cut, it would imply that "finally" may appear inserted between the words of the locked phrase "the prisoners".

Figure 6:
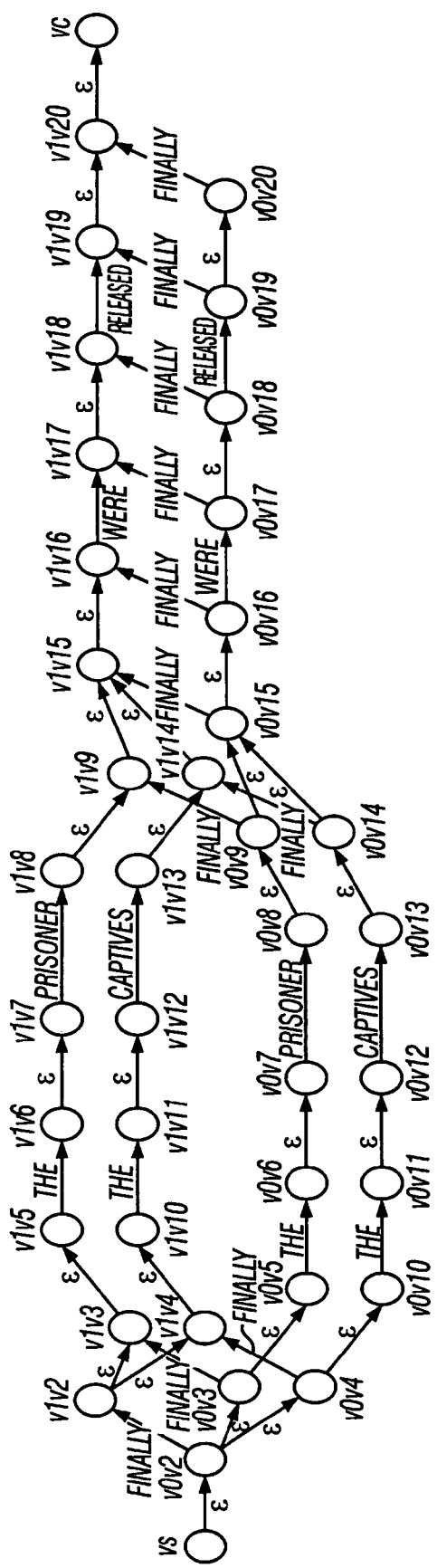

The IDL formalism is linked with the FSA formalism by providing a mapping from an IDL-graph G(Π) to an acyclic finite-state acceptor A(Π). Because both formalisms are used for representing finite languages, they have comparable representational power. FIG. 6 shows the equivalent finite state acceptor A(Π) corresponding to the IDL graph of FIG. 3. The IDL representation is much more compact. The set of states of A(Π) is the set of cuts of G(Π). The initial state of the finite-state acceptor is the state corresponding to cut vs, and the final states of the finite-state acceptor are the state corresponding to cuts that contain ve.

The following denotes the state of A(Π) by the name of the cut to which it corresponds. A transition labeled α in A(Π) between states [vi', ... vk' ... v'j] and state [v"I ... v"k ... v"j] occurs if there is an edge (v'k, α, v"k in G(Π). For the example in FIG. 3, the transition labeled were between states [v0v16] and [v1v16] occurs because of the edge labeled finally between nodes v0 and v1 in FIG. 5. The two representations G(Π) and A(Π) are equivalent in the sense that the language generated by IDL-graph G(Π) is the same as the language accepted by FSA A(Π).

The conversion from the IDL representation to the FSA representation destroys the compactness property of the IDL formalism, because of the explicit enumeration of all possible interleavings, which causes certain labels to appear repeatedly in transitions. For example, a transition labeled finally appears 11 times in the finite state acceptor in FIG. 6, whereas an edge labeled finally appears only once in the IDL-graph in FIG. 1.

The Computational Properties of IDL-expressions are discussed herein. A first embodiment describes IDL-graphs and Weighted Finite-State acceptors.

As mentioned above, the generation mechanism that concerns this disclosure performs an efficient intersection of IDL expressions with n-gram language models. Following (Mohri et al., 2002; Knight and Graehl, 1998), language models are first implemented using weighted finite-state acceptors (wFSA). The above describes a mapping from an IDL-graph G(Π) to a finite-state acceptor A(Π). This finite-state acceptor A(Π), provides a weighted finite-state acceptor W(Π), by splitting the states of A(Π) according to the information needed by the language model to assign weights to transitions. For example, under a bigram language model LM, state [v1v16] in FIG. 6 is split into three different states, [prisoners, v1v16], [captives, v1v16], and finally, v1v16], according to which (non-epsilon) transition was last used to reach this state. The transitions leaving these states have the same labels as those leaving state [v1V16], and are weighted using the language model probability distributions pLM(.|captives), and pLM(.|prisoners), pLM(.|captives), and PLM (.|finally), respectively.

This point therefore already represents intersecting IDL-expressions with n-gram language models. From an IDL-expression r, following the mapping Π->g(Π) ->A(Π)->W (Π), a weighted finite-state acceptor is obtained. This allows using a single-source shortest path algorithm for directed acyclic graphs (Cormen et al., 2001) to extract the realization corresponding to the most probable path.

Premature unfolding of the IDL-graph into a finite-state acceptor can destroy the representation compactness of the IDL representation. For this reason, techniques are disclosed that, although similar in spirit with the single-source shortest-path algorithm for directed acyclic graphs, perform on-the-fly unfolding of the IDL-graph, with a mechanism to control the unfolding based on the scores of the paths already unfolded. Such an approach has the advantage that prefixes that are extremely unlikely under the language model may be regarded as not so promising, and parts of the IDL expression that contain them may not be unfolded. This may lead to savings.

A disclosed technique describes generation via Intersection of IDL-expressions with Language Models Algorithm IDL-NGLM-BFS. This intersects an IDL-graph with an n-gram language model LM using incremental unfolding and breadth-first search.

The pseudocode for the IDL-NGLM-BFS is shown below:

| IDL-NGLM-BFS(G, LM) |
|---|
| 1    active ← {[vs$^G$]} |
| 2    flag ← 1 |
| 3    while flag |
| 4      do unfold ← UNFOLDIDLG(active, G) |
| 5        EVALUATENGLM(unfold, LM) |
| 6        if FINALIDLG(unfold, G) |
| 7          then flag ← 0 |
| 8        active ← unfold |
| 9    return active |

This builds a weighted finite state acceptor W corresponding to an IDL-graph G incrementally, by keeping track of a set of active states, called active. The incrementality comes from creating new transitions and states in W originating in these active states, by unfolding the IDL graph G; the set of newly unfolded states is called unfold. The new transitions in W are weighted according to the language model.

If a final state of W is not yet reached, the while loop is closed by making the unfold set of states to be the next set of active states. Note that this is actually a breadth first search (BFS) with incremental unfolding. This technique still unfolds the IDL-graph completely, and therefore may have the potential drawback of lack of compactness.

An interesting contribution of algorithm IDL-NGLM-BFS, however, is its incremental unfolding. If, instead of line 8 in mechanisms to control which unfold states become part of the active state set for the unfolding iteration, additional techniques are obtained.

Technique IDL-NGLM-A* is obtained by modifying line 8, thus obtaining the pseudocode:

| IDL-NGLM-A*(G, LM) |
|---|
| 1    active ← {[vs$^G$]} |
| 2    flag ← 1 |
| 3    while flag |
| 4      do unfold ← UNFOLDIDLG(active, G) |
| 5        EVALUATENGLM(unfold, LM) |
| 6        if FINALIDLG(unfold, G) |
| 7          then flag ← 0 |
| 8        for each state in unfold |
|            do PUSH(astarQ, state) |
|          active ← POP(astarQ) |
| 9    return active |

This uses a priority queue, astarQ, as a control mechanism from which the states from unfold are PUSH-ed, sorted according to an admissible heuristic function (Russell and Norvig, 1995). In the next iteration, active is a singleton set containing the state pop-ed out the top of the priority queue.

IDL-NGLM-BEAM is obtained by modifying line 8 to obtain:

| IDL-NGLM-BEAM(G,LM,beam) |
|---|
| 1    active ← {[vs$^G$]} |
| 2    flag ← 1 |
| 3    while flag |
| 4      do unfold ← UNFOLDIDLG(active, G) |
| 5        EVALUATENGLM(unfold, LM) |
| 6        if FINALIDLG(unfold, G) |
| 7          then flag ← 0 |
| 8        active ← BEAMSTATES(unfold, beam) |
| 9    return active |

In this embodiment, the unfolding is controlled using a probabilistic beam beam, which, via the BEAMSTATES function, selects as active states only the states in unfold reachable with a probability higher or equal to the current maximum probability times the probability beam beam.

The IDL representation is well suited for computing accurate admissible heuristics under language models. These heuristics are needed by the IDL-NGLM-A*algorithm, and are also employed for pruning by the IDL-NGLM-BEAM algorithm.

For each state S in a weighted finite-state acceptor W corresponding to an IDL-graph G, one can efficiently extract from G—without further unfolding the set 'of all edge labels that can be used to reach the final states of W. This set of labels, denoted FE s/all, is an overestimation of the set of future events reachable from S, because the labels under the V operators are all considered. From FE S/all and the n-1 labels (when using an n-gram language model) recorded in state S the set of label sequences of length n-1 is obtained. This set, denoted FCEs, is an (over)estimated set of possible future conditioning events for state S, which has the most cost-efficient future conditioning events for state S. Using FCEs, one needs to extract from FE: the set of most cost-efficient future events from under each v operator. This set, denoted FCEs, is used to arrive at an admissible heuristic for state S under a model LM, using Equation 2a:

$$h(S) = \sum_{e \in FE_S} -\log\left(\max_{ce \in FCE_S} p_{LM}(e|ce)\right) \quad (2a)$$

If h*(S) is the true future cost for state S, this guarantees that h(S)<=h*(S)from the way FEs and FCEs are constructed. Note that, as it often happens with admissible heuristics, h(S) can come arbitrarily close to h*(S), by computing increasingly better approximations FCEs of FCE*s. Such approximations, however, require increasingly advanced unfoldings of the IDL-graph G (a complete unfolding of G for state S gives FCEs=FCE*s, and consequently h(S)=h*(S)). It follows that arbitrarily accurate admissible heuristics exist for IDL-expressions, but computing them only requires finding a balance between the time and space requirements for computing better heuristics and the speed-up obtained by using them in the search algorithms.

Formal Properties of IDL-NGLM Algorithms

The following theorem states the correctness of our algorithms, in the sense that they find the maximum path encoded by an IDL-graph under an gram language model.

Theorem 1 Let K be an IDL-expression, G(Π) its IDL-graph, and W(T) its wFSA under an n-gram language model LM. Algorithms NGLM-BFS and IDL-NGLM-A* find the path of maximum probability under LM. Algorithm IDL-NGLM-BEAM finds the path of maximum probability under LM, if all states in W(T) along this path are selected by its BEAMSTATES function. The proof of the theorem follows directly from the correctness of the BFS and A*search, and from the condition imposed on the beam search.

The next theorem characterizes the run-time complexity of these algorithms, in terms of an input IDL expression Π and its corresponding IDL-graph G(Π) complexity. There are three factors that linearly influence the run-time complexity of these algorithms: a is the maximum number of nodes in G(Π) needed to represent a state in A(Π)–a depends solely on Π; w is the maximum number of nodes in G(Π) needed represent a state in W(Π)–w depends on Π and n, the length of the context used by the n-gram language model; and K is the number of states of W (Π)–K also depends on Π and n. Of these three factors, K is by far the predominant one, and we simply call K the complexity of an IDL-expression.

> Theorem 2 Let π be an IDL-expression, G(π) its IDL-graph, A(π) its FSA, and W(π) its wFSA under an n-gram language model. Let V[A(π)] be the set of states of A(π), and V[W(π)] the set of states of W(π). Let also a = $\max_{c \in \nu[A(\pi)]} |c|$, w = $\max_{c \in \nu[W(\pi)]} |c|$, and K = |V[W(π)]|. Algorithms IDL-NGLM-BFS and IDL-NGLM-BEAM have run-time complexity O(awK). Algorithm IDL-NGLM-A* has run-time complexity O(awK log K).

These techniques are linear in the complexity of the input IDL-expression (with an additional log factor in the case of A* search due to priority queue management) which may be a significant advantage. Depending on the input IDL-expression, the task addressed can vary in complexity from linear to exponential. That is, for the intersection of an IDL-expression.

Intersection of WIDL-expressions with N-gram Language Models can thus be carried out as described above. The techniques for intersecting IDL-expressions with n-gram language models can be used almost without modification for intersecting WIDL-expressions with n-gram language models. These algorithms operate over IDL-graphs, and both IDL-graphs and WIDLgraphs are the same kind of graphs, over which algorithms operate in the same manner. The only modification to the algorithms presented in (Soricut and Marcu, 2005) consists on replacing line 5 in each of the IDL-NGLM-BFS, IDL-NGLM-A*, and IDL-NGLM-BEAM algorithms with a function evaluating the set of unfold state s under both the language model distributions and the input WIDL-expression distributions: EVALUATEWIDL-NGLM (unfold, G, LM).

The Result is a New Family of Algorithms:

WIDL-NGLM-BFS, WIDL-NGLM-A*, and WIDL-NGLM-BEAM, which perform intersection between the ranked finite languages of WIDL-expressions and n-gram language models. Similar with the IDL representation, accurate admissible heuristics can be computed for WIDLexpressions as well. In fact, Equation (2) above computes also an admissible heuristic for WIDL-expressions as well, as it considers the WIDL costs to be 0 (an underestimation) for each state in the weighted finite state acceptor. More accurate admissible heuristics, however, can be computed, and the result is lower degree of unfolding of the WIDL-expressions and faster search.

The intersection of IDL and WIDL-expressions with syntax-based language models is performed using a similar approach. A (W)IDL-expression is first mapped into a (W)IDL-graph, which is unfolded on-the-fly into a weighted finite state acceptor. Admissible heuristics are used to compute cost estimates for each state created in the finite state acceptor. The cost estimates are used in deciding what parts of the (W)IDL-graph are unfolded, and in what order. To arrive at the cost estimates, the syntax-based language model is used in evaluating prefix syntax trees, corresponding to the prefix strings unfolded from the (W)IDL-graph, as well as in evaluating the future costs, by estimating the cost of the most probable syntax tree which is consistent with the prefix tree already created. The resulting admissible heuristics are used to create a family of algorithms for intersecting (W)IDL-expressions with syntax-based language models, such as A* search algorithms and probabilistic beam search algorithms. Similar with the algorithms for n-gram language model intersection, the only difference between these types of algorithms consists in the selection of the finite state acceptor states which are used for the next round of on-the-fly unfolding of the WIDL-graph.)

Figures 7A, 7B:
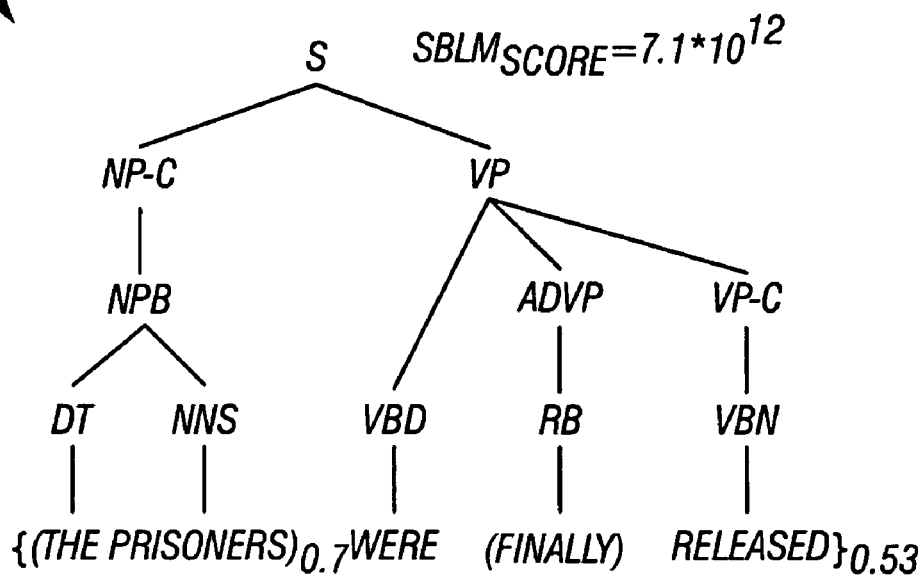
FIG. 7 shows an exemplary flowchart which can be carried out by a processor when choosing from a large set of weighted possible strings the one of highest probability under an ngram and/or syntax-based language model.

FIG. 7 illustrates a flow chart of the end result. A WIDL expression, shown as 700, along with its associated probabilities, is mapped into a syntactic parse tree 710. A WIDL score is produced from the probability distributions δ1 and δ2. A language generation model score NGLM is produced from evaluating the realized string under the n-gram language model. The SBLM score results from evaluating the syntactic tree under a syntactic language model. In this way, the WIDL expressions can be evaluated using a language model.

Although only a few embodiments have been disclosed in detail above, other modifications are possible, and this disclosure is intended to cover all such modifications, and most particularly, any modification which might be predictable to a person having ordinary skill in the art. For example, other operators, besides those described herein, may be used. Also, while the above describes certain techniques of mapping to and intersecting with the natural language model, other techniques of doing this are contemplated. Moreover, while the above has described, and is predominantly directed to, weighted IDL, it should be understood that many of the techniques described here and be used with other kinds of IDL.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method for expressing language information using compact notation, the method comprising:
    executing instructions embodied on a computer readable storage medium to direct a processor to define a compact notation for representing a large set of weighted strings via defined operators that include:
    a family of first operators that are probability weighted word choice disjunction operators that allow for multiple word choices which are probabilistically weighted,
    a concatenation operator that forces strings within the language to be in an order stated by the operator,
    a probabilistically locked interleaving operator that probabilistically defines how arguments of the probabilistic operator are presented in a string;
    executing instructions embodied on a computer readable storage medium to direct a processor to convert the expression to a WIDL graph which is a function of beginning and end vertices and edges, a set of vertices and edges, an edge labeling function, and a vertex ranking function.

2. A method as in claim 1, further comprising executing instructions embodied on a computer readable storage medium to direct a processor to use the notation for a text to text application, by finding a highest probability string in the set represented by the notation.

3. A method as in claim 1, further comprising executing instructions embodied on a computer readable storage medium to direct a processor to use the notation for a text to text application, by finding a highest probability string in a set represented by the notation under an intersection of the set with a language model.

4. A method as in claim 3, wherein the language model is an n-gram language model.

5. A method as in claim 3, wherein the language model is a syntax-based language model.

6. A method as in claim 1, further comprising executing instructions embodied on a computer readable storage medium to direct a processor to intersect the WIDL graph with a language model.

7. A method as in claim 6, wherein the language model is an n-gram language model.

8. A method as in claim 6, wherein the language model is a syntax based language model.

9. A method as in claim 8, wherein the efficiently unfolding comprises minimizing a number of parts of the graph that need to be unfolded.

10. A method as in claim 6, wherein the processor intersects the WIDL graph, at least, by forming a graph using the notation, and efficiently unfolding vertices of the graph.

11. A method as in claim 10, wherein the unfolding comprises mapping the graph to a finite state acceptor.

12. A method as in claim 1, further comprising executing instructions embodied on a computer readable storage medium to direct a processor to use the notation to translate a source language sentence into a target language sentence.

13. A method as in claim 1, further comprising executing instructions embodied on a computer readable storage medium to direct a processor to use the notation to automatically summarize a plurality of phrases.

14. A method as in claim 1, further comprising executing instructions embodied on a computer readable storage medium to direct a processor to use the notation for a text to text application.

15. A method for expressing language information using compact notation, the method comprising:
executing instructions embodied on a computer readable storage medium to direct a processor to define a language in a notation that compactly represents a plurality of different expressions in the notation, and weights different alternatives according to a probabilistic interpretation;
executing instructions embodied on a computer readable storage medium to direct a processor to carry out a text-to-text natural language application by intersecting the notation with a language model;
wherein the intersecting comprises converting the notation into a graph indicative of the notation, and intersecting the graph with the language model;
wherein the graph is intersected with an n- gram type language model by implementing the language model as a weighted finite state acceptor, mapping from the ideal graph to the finite state acceptor, and splitting the states to assign weights to transitions using a technique that is linear in the complexity of an input expression.

16. A method as in claim 15, wherein the language model is an n-gram language model.

17. A method as in claim 15, wherein the language model is a syntax-based language model.

18. A method as in claim 15, wherein the converting comprises minimizing a number of parts of the graph that are unfolded.

19. A method as in claim 15, wherein the converting comprises labeling edges of the graph corresponding to cuts of the graph.

20. A method as in claim 15, wherein the converting comprises finding a single source shortest path for a directed graph.

21. A method as in claim 15, wherein the converting comprises unfolding a graph on the fly scoring unfolded paths, and controlling an amount of unfolding based on scores of previous unfolded parts.

22. A method as in claim 21, wherein the controlling comprises determining unlikely parts of the path, and preventing further unfolding of the unlikely parts.

23. A method as in claim 15, wherein the converting comprises incrementally unfolding a path, while maintaining information about unfolded parts.

24. A method as in claim 23, wherein the information is probabilistic information.

25. A method as in claim 15, wherein the converting comprises determining an estimate of a heuristic which represents a cost efficient future conditioning event for specified ones of the operators.

26. A method as in claim 25, wherein the heuristic is used to extract a set of most cost effective future events for each operator.

27. A method as in claim 15, wherein the intersecting comprises finding a realization corresponding to the path of maximum probability.

28. A method as in claim 15, wherein the intersecting comprises finding a probability of a string by multiplying probabilities of each word in the string given n words before it.

29. A method as in claim 28, wherein the obtaining cost estimates comprises evaluating syntax trees.

30. A method as in claim 15, wherein the graph is intersected with a syntax-based language model by unfolding the graph on-the-fly into a finite state acceptor, using heuristics to compute cost estimates for each state in the acceptor, and using the cost estimates to decide what parts of the graph to unfold and in what order.

31. A method as in claim 30, wherein the probability of a hierarchical structure associated with a string is obtained by multiplying probabilities of creating each of the nodes in the hierarchical structure.

32. A system for expressing language information using compact notation, the system comprising:
a computer readable storage medium having instructions embodies thereon; and
a processor for executing instructions embodied on the computer readable storage medium to direct the processor to define a compact notation for representing a large set of weighted strings via defined operators that include:
a family of first operators that are probability weighted word choice disjunction operators that allow for multiple word choices which are probabilistically weighted;
a concatenation operator that forces strings within the language to be in an order stated by the operator,
a probabilistically locked interleaving operator that probabilistically defines how arguments of the probabilistic operator are presented in a string;
wherein the processor also executes instructions embodied on the computer readable storage medium to direct the processor to intersect the set with a language model;

wherein the set is intersected by, at least, converting the expression to a WIDL graph which is a function of beginning and end vertices and edges, a set of vertices and edges, an edge labeling function, and a vertex ranking function.

33. A system as in claim 32, wherein the notation is used for a text-to-text application.

34. A system as in claim 32, wherein the language model is an n-gram language model.

35. A system as in claim 32, wherein the language model is a syntax-based language model.

36. A system as in claim 32, wherein the set is also intersected by unfolding the graph, while minimizing a number of parts of the graph that need to be unfolded.

* * * * *